(12) United States Patent
Wilson

(10) Patent No.: US 8,462,595 B2
(45) Date of Patent: Jun. 11, 2013

(54) OPTICAL PICKUP ASSEMBLY

(75) Inventor: Scott D. Wilson, Thornton, CO (US)

(73) Assignee: Oracle International Corporation, Redwood City, CA (US)

( * ) Notice: Subject to any disclaimer, the term of this patent is extended or adjusted under 35 U.S.C. 154(b) by 278 days.

(21) Appl. No.: 13/069,917

(22) Filed: Mar. 23, 2011

(65) Prior Publication Data

US 2012/0246665 A1    Sep. 27, 2012

(51) Int. Cl.
*G11B 7/00* (2006.01)

(52) U.S. Cl.
USPC ............................................ 369/44.17

(58) Field of Classification Search
USPC .......... 369/44.12, 44.14, 44.15, 44.16, 44.17, 369/44.18, 44.19, 113
See application file for complete search history.

(56) References Cited

U.S. PATENT DOCUMENTS 5,995,269 A * 11/1999 Van Rosmalen ........... 359/209.1
6,785,063 B2    8/2004 Peng et al.

* cited by examiner

*Primary Examiner* — Nabil Hindi
(74) *Attorney, Agent, or Firm* — Brooks Kushman P.C.

(57) ABSTRACT

An optical pickup assembly that has flexible beams that support an objective lens for adjustment in a focusing direction and a tracking direction. The flexible beams are used to support and move the objective lens. A controller operates electromagnetic actuators that move the flexible beams.

20 Claims, 5 Drawing Sheets

OPTICAL PICKUP ASSEMBLY

TECHNICAL FIELD

The present invention relates to a narrow profile focus and tracking actuator for an optical tape pickup unit.

BACKGROUND

Optical pickup units are used in optical data tape storage machines to read and write data on an optical tape.

Conventional focusing and tracking actuators for optical pickup units include an objective lens that may be supported on suspension wires that extend between permanent magnets. Electromagnetic coils may be actuated to move the objective lens in conjunction with the suspension wires. Such prior art focus and tracking lens actuators tend to be bulky and do not lend themselves to assembling a large number of optical pickup units along a limited length of a tape stabilizer. Prior art actuators currently used in commercial optical disk drives may permit placement of only four or five optical pickup units along a three inch tape/stabilizer.

Applicant's invention is directed to solving the problem of maximizing the number of optical pickup units along the limited length of a tape/stabilizer in an optical tape drive storage machine.

SUMMARY

According to one aspect of the present invention, an optical pickup assembly is provided that has a narrow profile that results from utilizing flexure beams that are connected to an objective lens that is moved for tracking and focusing. The optical pickup assembly includes a laser projector that directs light through an objective lens toward an optical tape. A photodiode integrated circuit receives light reflected from the optical tape through the objective lens to generate an electronic signal. First and second tracking flexure beams are operatively connected to the objective lens that flex in the tracking direction perpendicular to a tape path direction and parallel to the optical data storage tape. A first and a second focus flexure beam are operatively connected to the objective lens that flex only in a focusing direction perpendicular to the tape path direction and normal to the surface of the data storage tape. A tracking electromagnetic actuator is grounded to the optical pickup assembly, for example, by being connected to a side wall of the optical pickup assembly, and is operatively connected to the first and second tracking flexure beams for movement in the tracking direction. A focusing electromagnetic actuator is grounded to the optical pickup assembly, for example, by being attached to a side wall of the optical pickup assembly, for movement in the focusing direction. A controller receives the electronic signal from the photodiode integrated circuit and provides a tracking adjustment signal to the tracking electromagnetic actuator and a focusing signal to the focusing electromagnetic actuator.

According to another aspect of the present invention, an actuator system is provided for an optical pickup assembly that has an objective lens that is used to read and write data to an optical data storage tape. The actuator system comprises a first tracking flexure beam and second tracking flexure beam that flex in a tracking direction that is perpendicular to the tape path direction and parallel to the optical data storage tape. First and second focus flexure beams are connected to the objective lens. The first and second focus flexure beams flex in a focusing direction that is normal to the data storage tape. A tracking electromagnetic actuator, or voice coil, is grounded to the optical pickup assembly and is operatively connected to the tracking flexure beams to move the first and second tracking flexure beams in the tracking direction. A focusing electromagnetic actuator, or voice coil, is grounded to the optical pickup assembly and is operatively connected to the first and second focus flexure beams to move them in the focusing direction. A controller provides a tracking adjustment signal to the tracking electromagnetic actuator and a focusing signal to the focusing electromagnetic actuator.

According to other aspects of the optical pickup assembly and actuator system described above, the flexure beams may include two planar flexible members that are parallel to each other. Each of the flexible members may be secured between blocks that hold opposite ends of the flexible members in a spaced relationship relative to each other. First and second tracking flexure beams may include a fixed block that is secured to a side wall on an inner end of the pair of flexible members and that are secured on an outer end of the pair of flexible members to a movable block.

One or two of the tracking electromagnetic actuators may be attached to the objective lens assembly. The first and second focusing flexure beams may be operatively secured to the objective lens on a first end of a pair of flexible links and to the movable block on a second end of the pair of flexible links. The focusing flexure beams may be oriented perpendicular to the tracking flexure beams. One or two focusing electromagnetic actuators may be attached to the objective lens assembly.

According to another aspect of the invention, a tracking sensor may be grounded to the optical pickup assembly to sense the displacement of one of the tracking flexure beams. First and second tracking sensors may be grounded to the optical pickup assembly so that one tracking sensor senses displacement of the first tracking flexure beam, while the second tracking sensor senses displacement of the second tracking flexure beam.

These and other aspect of Applicant's invention will be better understood in view of the attached drawings and the following detailed description of the illustrated embodiments.

DETAILED DESCRIPTION

Detailed embodiments of the present invention are disclosed in this detailed description of the illustrated embodiments. It is to be understood that the disclosed embodiments are merely exemplary of the invention that may be embodied in various and alternative forms. The figures are not necessarily to scale and some features may be exaggerated or minimized to show details of particular components. Specific structural and functional details that are disclosed are not to be interpreted as limiting, but merely as a representative basis for teaching one skilled in the art to make and use the present invention.

Figure 1:
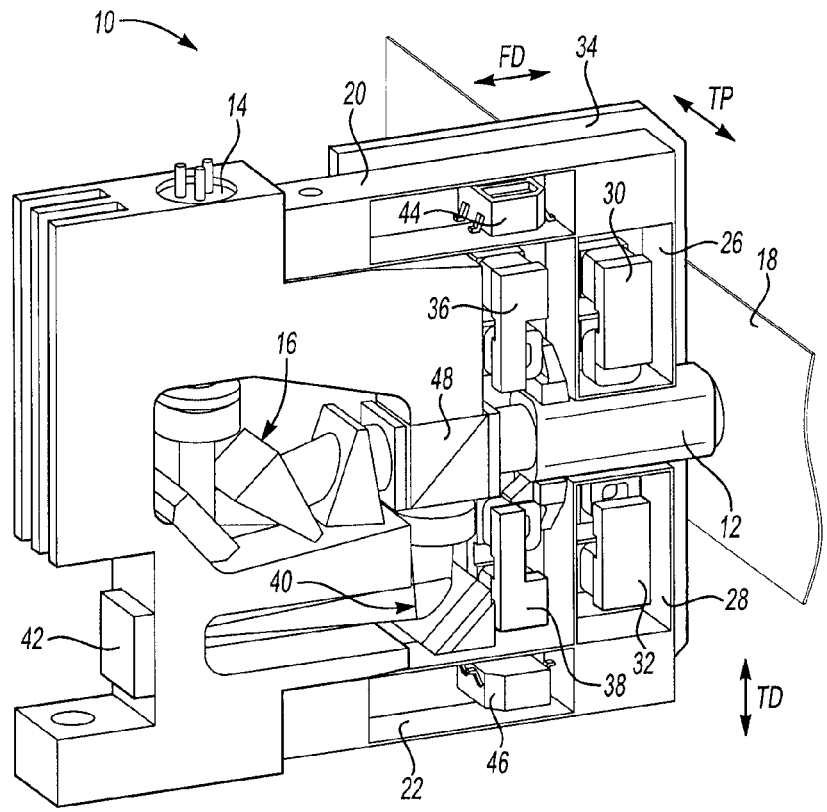
FIG. 1 is a perspective view of an optical pickup assembly made according to one embodiment of the present invention.
Figure 2:
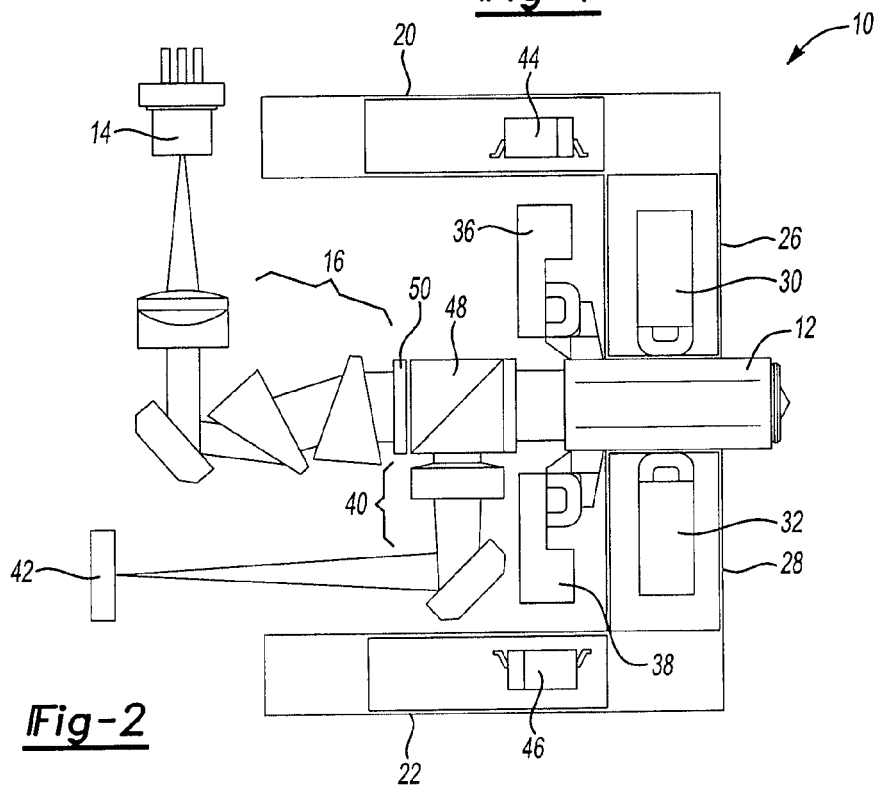
FIG. 2 is a diagrammatic side elevation view of the optical pickup assembly shown in FIG. 1.

Referring to FIGS. 1 and 2, and optical pickup assembly 10 is illustrated that includes an objective lens 12 to which a laser 14 is directed through a projection lens set 16 onto an optical data storage tape 18. The arrow TP illustrates the tape path direction. The optical pickup assembly 10 includes a first tracking flexure beam 20 and a second tracking flexure beam 22 that are positioned on opposite sides of the objective lens 12. The tracking flexure beam 20, 22 are provided to move the objective lens 12 in the tracking direction indicated by the arrow TD. A first focus flexure beam 26 and second focus flexure beam 28 are attached to the objective lens 12. The first and second focus flexure beams 26, 28 are secured between the first and second tracking flexure beams 20, 22 and the objective lens 12. The focus flexure beams 26 and 28 are provided to move the objective lens 12 in the focusing direction indicated by the arrow FD.

The tracking flexure beams, focusing flexure beams and objective lens are all disposed in a planar space that extends in the tracking direction and in the focusing direction FD within the optical pickup assembly 10. The width of the planar space is limited to less than the width of the optical pickup assembly 10 and is minimized to reduce the amount of lateral space required to accommodate multiple optical pickup units 10.

A first tracking electromagnetic actuator 30 and second tracking electromagnetic actuator 32 are operatively connected between a side wall 34 and the first and second tracking flexure beams 20, 22 to move the objective lens 12 in the tracking direction TD. A first focusing electromagnetic actuator 36 and a second focusing electromagnetic actuator 38 are operatively connected between the side wall 34 and the first and second flexure beams 26, 28 to move the objective lens 12 in the focusing direction FD.

A reflection lens set 40 is also illustrated that receives reflected light from the optical data storage tape 18. The reflection lens set 40 directs light to a photo diode integrated circuit 42 that reads digital data recorded on the optical storage tape 18. The diode integrated circuit 42 also receives tracking data and focusing data that are used to control the first and second tracking electromagnetic actuators 30, 32 and the first and second focusing electromagnetic actuators 36, 38.

A first tracking sensor 44 and a second tacking sensor 46 may be using to track movement of a first and second tracking flexure beam 20, 22. The optical pickup assembly 10 may include a polarizing beam splitter 48 that polarizes the laser light emitted from the laser 14. In one embodiment, an optical grating 50 may be provided adjacent to the polarizing beam splitter 48. The optical grating 50 is used to split the laser beam into multiple beams, creating multiple spots, typically three, at the optical tape's surface. The additional two spots may be used for generating a differential push-pull tracking error signal that compensates the standard push-pull tracking error signal offset experienced as the objective lens 12 moves from its center position. The optical grating 50 may be eliminated according to one embodiment when first and second tracking sensors 40, 46 are used to track the movement of the objective lens 12 in the tracking direction TD.

Figure 3:
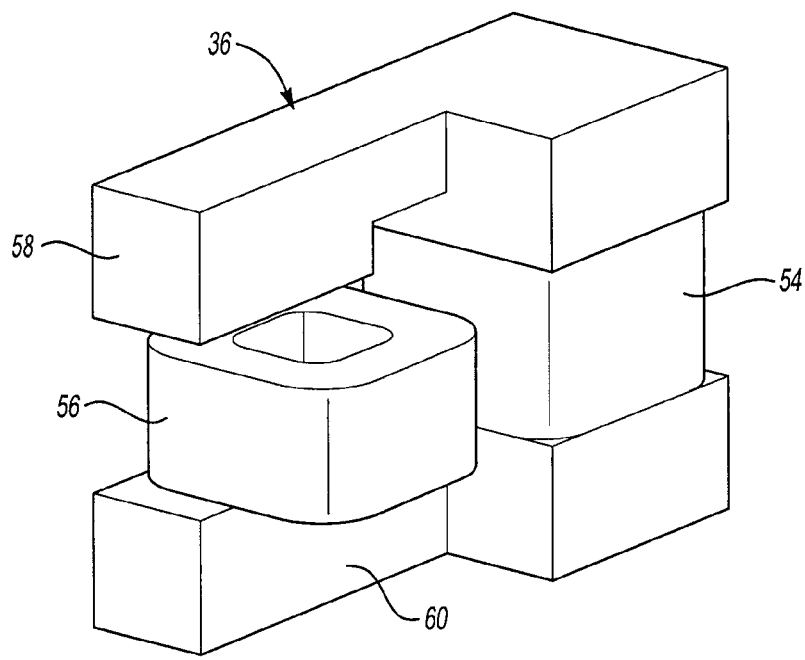
FIG. 3 is a perspective view of a focusing electromagnetic actuator made according to one embodiment of the present invention.

Referring to FIG. 3, a focusing electromagnetic actuator 36 is shown to include a magnet 54 that creates a flux field. A coil 56 is supported between an inner armature 58 and an outer armature 60. The coil 56 is operatively attached to the objective lens 12 to move the objective lens 12 in the focusing direction FD. The coil is selectively actuated to move the objective lens 12.

Figure 4:
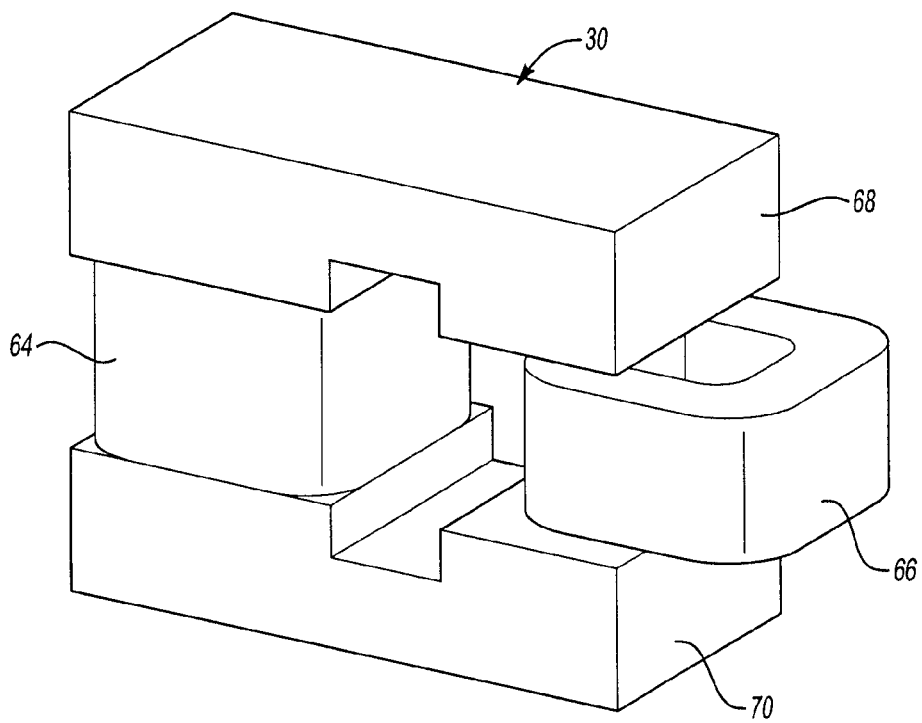
FIG. 4 is a perspective view of a tracking electromagnetic actuator made according to one embodiment of the present invention.

Referring to FIG. 4, a tracking electromagnetic actuator 30 is shown to include a magnet 64 that creates a flux field. A coil 64 is supported between an inner armature 68 and an outer armature 70. The coil 60 moves the objective lens 12 in the tracking direction TD.

Figure 5:
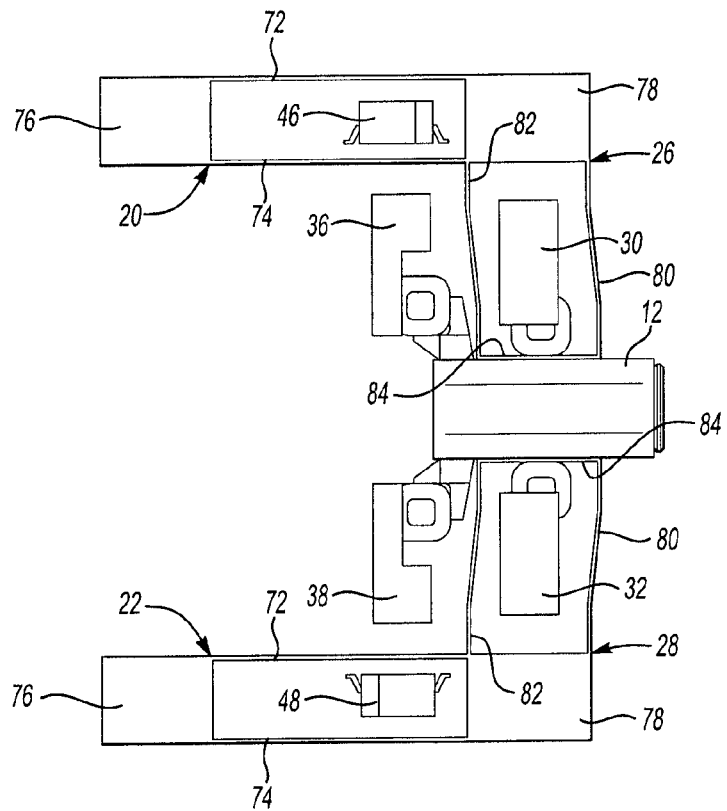
FIG. 5 is a diagrammatic side elevation view of an actuator system for an optical pickup assembly according to the embodiment of FIG. 1 illustrating the focusing function of the actuator system.

Referring to FIG. 5, and actuator system for an optical pickup assembly 10 is shown. The objective lens 12 of the optical pickup assembly 10 is operatively connected to the first and second tracking flexure beams 20, 22 and the first and second focus flexure beams 26, 28. In FIG. 5 objective lens 12 is shown with the first and second focusing electromagnetic actuators 36 and 38 adjusting the focus by displacing the objective lens 12 toward the optical data storage tape 18 (shown in FIG. 1). Each of the tracking flexure beams 20 includes a first flexible planar member 72 and a second flexible planar member 74 that are held parallel to each other. The flexible planar members 72 and 74 extend from a fixed block 56 that is fixed to the side wall 34 (shown in FIG. 1) and a movable block 78.

Each of the focus flexure beams 26, 28 include an inner flexible member 80 and an outer flexible member 82 that are held parallel to each other. The inner and outer flexible members 80 and 82 extend from the movable block 78 to an end wall 84. The end wall 84 is attached to the objective lens 12.

Figure 6:
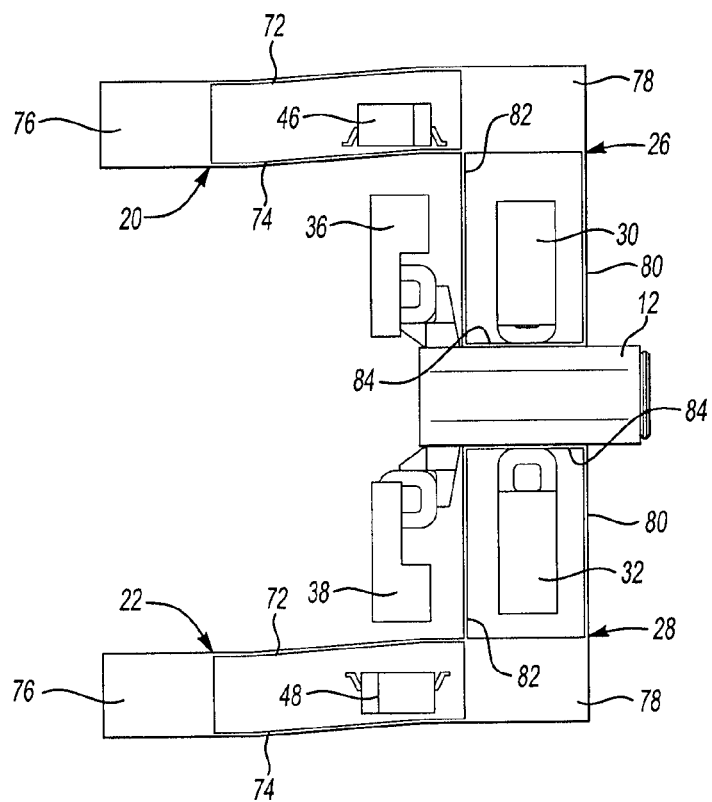
FIG. 6 is a diagrammatic side elevation view of the actuator system made according to the embodiment of FIG. 1 illustrating the tracking function of the actuator system.

Referring to FIG. 6, the actuator system is shown with the tracking flexure beams 20 and 22 being moved by the tracking electromagnetic actuators 30 and 32. The tracking electromagnetic actuators 30 and 32 are actuated to displace the objective lens 12 upwardly to follow the tracks on the optical data storage tape 18 (shown in FIG. 1).

Figure 7:
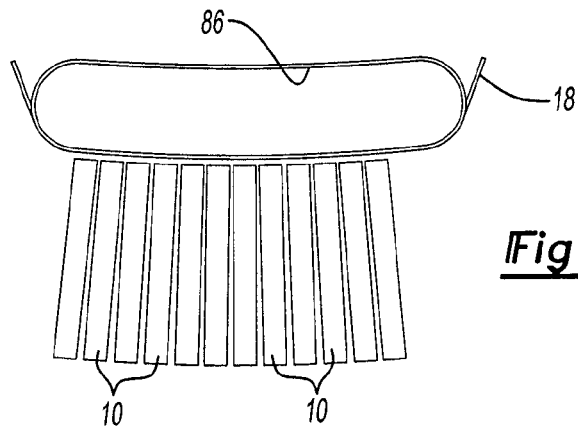
FIG. 7 is a diagrammatic plan view of a plurality of optical pickup assemblies dispensed on the opposite side of a segment of optical data storage tape from a tape stabilizer.

Referring to FIG. 7, a plurality of optical pickup assemblies 10 are shown to have a narrow cross section enabling optical pickup assembly 10 to be assembled in a closely space relationship on one side of an optical data storage tape 18 that is entrained about a tape stabilizer 86. By locating a large number of optical pickup assemblies 10 in closely spaced relationship, different tracks may be written or read at the same time to maximize the number of optical pickup assemblies 10. The entire width of the tape may be simultaneously accessed to maximize data transfer rates. In this way optical tape communication systems can be developed to greatly exceed the capability of alternative archive storage technologies.

Figure 8:
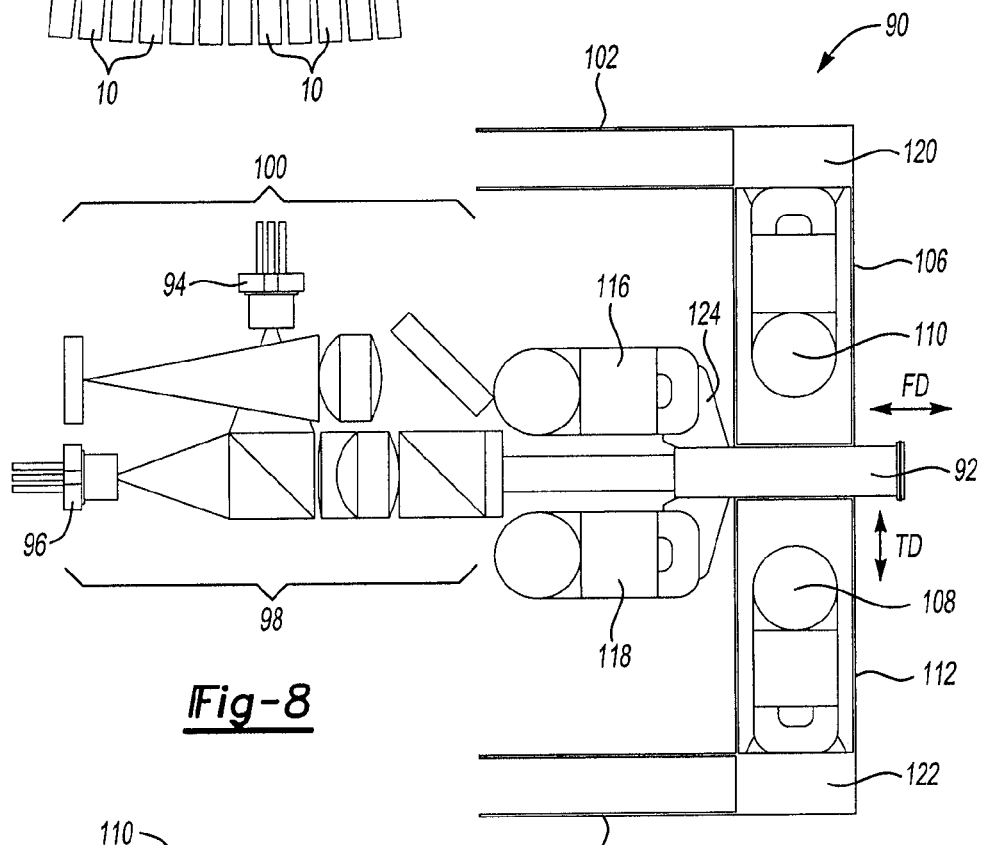
FIG. 8 is a fragmentary diagrammatic side elevation view of an alternative embodiment of an optical pickup assembly.

Referring to FIG. 8, an alternative embodiment of an optical pickup assembly 90 is shown that had an objective lens 92 to which a first laser 94 and second laser 96 may be directed to an optical data storage tape printer (not shown). The lasers are directed to a projection lens set 98 and are reflected through reflection lens set 100. For brevity, operation of the projection lens set 98 and reflection lens set 100 will not be repeated in relation to the alternative optical pickup assembly 90.

A first tracking flexure beam 102 and a second tracking flexure beam 104 are used to follow the tracks on the optical data storage tape 18 (shown in FIG. 1). The structure of the tracking flexure beams 102, 104 is similar to the structure of the flexure beam described with reference to FIGS. 5 and 6. A first focusing electromagnetic actuator 116 and a second focusing electromagnetic actuator 118 are shown secured between an upper floating block 120 and a lower floating block 122 and objective lens 92. Operation of the focusing electromagnetic actuators 116, 118 and the floating blocks 120, 122 is similar to the structure described previously with reference to FIGS. 5 and 6. The tracking electromagnetic actuators 110, 112 move the objective lens 92 in the tracking direction TD. The focusing electromagnetic actuators are operative to move the objective lens 92 in the focusing direction FD. A bracket 124 is secured between the first and second focusing electromagnetic actuators 116 and 118 and the objective lens 92.

Figure 9:
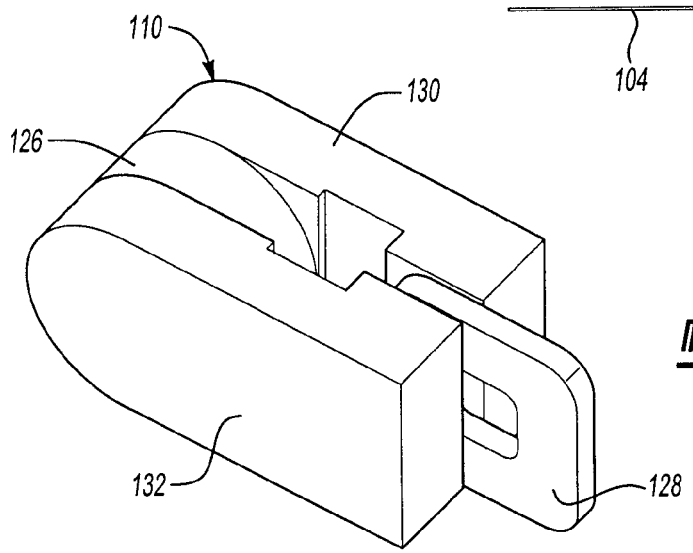
FIG. 9 is a perspective view of a tracking electromagnetic actuator made according to the embodiment of FIG. 8.

Referring to FIG. 9, an alternative embodiment of an electromagnetic actuator that may be used as either a tracking actuator or a focusing electromagnetic actuator is illustrated. The electromagnetic actuator includes a magnet 126 that provides a flux field. The electromagnetic actuator is attached or anchored to a side wall (shown in FIG. 1) that grounds the magnet 126. A coil 128 is supported by an inner armature 130 and an outer armature 132 relative to the optical pickup assembly 10. When the coil 128 is actuated it moves the tracking direction TD or focusing direction FD depending on whether it is to be used as a tracking electromagnetic actuator 112 or a focusing electromagnetic actuator 116.

Figure 10:
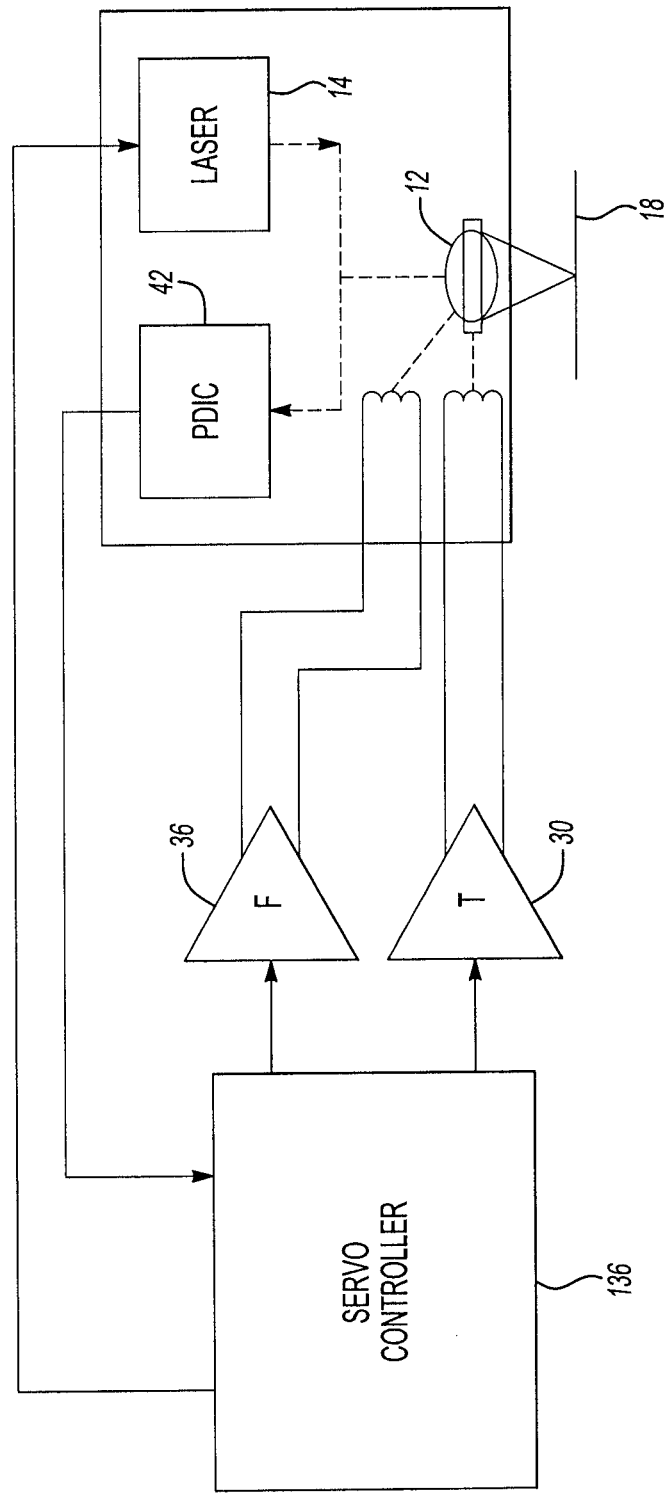
FIG. 10 is a schematic view of a controller for an optical pickup assembly.

Referring to FIG. 10, a servo controller 136 is shown that controls the actuation of the tracking electromagnetic actuator 30 and the focusing electromagnetic actuator 36. The laser 14 directs a laser beam through the objective lens 12 toward the data storage tape 18. The laser beam is reflected back from the optical data storage tape 18 through the objective lens 12 to the photo diode integrated circuit 42. The photo diode integrated circuit 42 receives data stored on the optical data storage tape 18. In addition, the photo diode integrated circuit 42 receives data relating to focus and tracking characteristics as the optical data storage tape 18 is read. The photo diode integrated circuit 42 transmits data back to the servo controller 136. The servo controller 136 controls the laser 14, the tracking electromagnetic actuator 30 and focusing electromagnetic actuator 36. It should be understood that two tracking electromagnetic actuators and two focusing electromagnetic actuators may be controlled by the servo controller 136 but for simplicity only one of each type of actuator is illustrated. The system may operate with a single focusing electromagnetic actuator and single tracking electromagnetic actuator.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An actuator system for an optical pickup assembly having an objective lens that is used to read and write data to an optical data storage tape which moves in a tape path direction, the actuator system comprising:
   a first tracking flexure beam and second tracking flexure beam that flex in a tracking direction perpendicular to the tape path direction and parallel to the optical data storage tape;
   a first focus flexure beam that is connected to the first tracking flexure beam and the objective lens;
   a second focus flexure beam that is connected to the second tracking flexure beam and the objective lens, wherein the first and second focus flexure beams flex in a focusing direction that is normal to the data storage tape;
   a tracking electromagnetic actuator is grounded to the optical pickup assembly and operatively connected to the first and second tracking flexure beams to move the first and second tracking flexure beams in the tracking direction;
   a focusing electromagnetic actuator is grounded to the optical pickup assembly and operatively connected to the first and second focus flexure beams to move the first and second focus flexure beams in the focusing direction; and
   a controller provides a tracking adjustment signal to the tracking electromagnetic actuator and a focusing signal to the focusing electromagnetic actuator.

2. The actuator system of claim 1 wherein each of the flexure beams includes two planar flexible members that are parallel to each other.

3. The actuator system of claim 2 wherein each of the flexible members is secured between a pair of blocks that hold opposite ends of the flexible members in a spaced relationship relative to each other.

4. The actuator system of claim 1 wherein the first and second tracking flexure beams each includes a fixed block that is secured to a side wall on an inner end of a pair of flexible members and a movable block on an outer end of the pair of flexible members, and the first and second focusing flexure beams are operatively secured to the objective lens on a first end of a pair of flexible links and is secured to the movable block on a second end of the pair of flexible links.

5. The actuator system of claim 4 wherein the tracking electromagnetic actuator is attached to the movable block.

6. The actuator system of claim 4 wherein each of the tracking flexure beams are oriented perpendicular to one of the focusing flexure beams.

7. The actuator system of claim 1 wherein two focusing electromagnetic actuators are attached to the objective lens assembly.

8. The actuator system of claim 1 wherein two tracking electromagnetic actuators are attached to the objective lens assembly.

9. The actuator system of claim 1 further comprising a tracking sensor grounded to the optical pickup assembly that senses displacement of one of the tracking flexure beams.

10. The actuator system of claim 1 further comprising first and second tracking sensors grounded to the optical pickup assembly, wherein one tracking sensor senses displacement of the first tracking flexure beam and the second tracking sensor senses displacement of the second tracking flexure beam.

11. An optical pickup assembly comprising:
   a laser projector that directs light through an objective lens toward an optical tape;
   a photo diode integrated circuit that receives light reflected from the optical tape through the objective lens and generates an electronic signal;
   a first tracking flexure beam and a second tracking flexure beam that are operatively connected to the objective lens that flex in a tracking direction perpendicular to a tape path direction and parallel to the optical data storage tape;
   a first focus flexure beam and a second focus flexure beam that are operatively connected to the objective lens that flex in a focusing direction that is normal to the surface of the optical data storage tape;

a tracking electromagnetic actuator is grounded to the optical pickup assembly and operatively connected to the first and second tracking flexure beams for movement in the tracking direction;

a focusing electromagnetic actuator is grounded to the optical pickup assembly and operatively connected to the first and second focus flexure beams for movement in the focusing direction; and a controller that receives the electronic signal from the photo diode integrated circuit and that provides a tracking adjustment signal to the tracking electromagnetic actuator to move the first and second tracking flexure beams in the tracking direction and provides a focusing signal to the focusing electromagnetic actuator to move the first and second focus flexure beams in the focusing direction.

12. The optical pickup assembly of claim 11 wherein each of the flexure beams includes two planar flexible members that are parallel to each other.

13. The optical pickup assembly of claim 12 wherein each of the flexible members are held in a spaced relationship relative to each other.

14. The optical pickup assembly of claim 11 wherein the first and second tracking flexure beams each includes a fixed block that is secured to a side wall on an inner end of a pair of flexible members and to a movable block on an outer end of the pair of flexible members, and the first and second focusing flexure beams are operatively secured to the objective lens on a first end of a pair of flexible links and is secured to the movable block on a second end of the pair of flexible links.

15. The optical pickup assembly of claim 14 wherein the tracking electromagnetic actuator is attached to the movable block.

16. The optical pickup assembly of claim 14 wherein each of the tracking flexure beams is oriented perpendicular to one of the focusing flexure beams.

17. The optical pickup assembly of claim 11 wherein two focusing electromagnetic actuators are attached to the objective lens assembly.

18. The optical pickup assembly of claim 11 wherein two tracking electromagnetic actuators are attached to the objective lens assembly.

19. The optical pickup assembly of claim 11 further comprising a tracking sensor grounded to the optical pickup assembly that senses displacement of one of the tracking flexure beams.

20. The optical pickup assembly of claim 11 further comprising first and second tracking sensors grounded to the optical pickup assembly, wherein one tracking sensor senses displacement of the first tracking flexure beam and the second tracking sensor senses displacement of the second tracking flexure beam.

* * * * *